(12) United States Patent
Krogager et al.

(10) Patent No.: US 7,368,073 B2
(45) Date of Patent: May 6, 2008

(54) REPAIR METHOD

(75) Inventors: Max Krogager, Linköping (SE); Jan Vaara, Linköping (SE)

(73) Assignee: SAAB, Linkoping (SE)

( * ) Notice: Subject to any disclaimer, the term of this patent is extended or adjusted under 35 U.S.C. 154(b) by 214 days.

(21) Appl. No.: 10/767,598

(22) Filed: Jan. 29, 2004

(65) Prior Publication Data
US 2004/0182492 A1  Sep. 23, 2004

(30) Foreign Application Priority Data
Jan. 30, 2003   (SE)   ................................ 0300226

(51) Int. Cl.
| | |
|---|---|
| B29C 70/56 | (2006.01) |
| B29C 70/16 | (2006.01) |
| B32B 38/08 | (2006.01) |
| B32B 7/00 | (2006.01) |
| B32B 5/12 | (2006.01) |
| B29C 70/54 | (2006.01) |

(52) U.S. Cl. .................. 264/36.22; 264/480; 264/258; 156/94

(58) Field of Classification Search ............ 264/36.22, 264/36.1, 480, 48, 642, 643, 258, 261; 156/94
See application file for complete search history.

(56) References Cited
U.S. PATENT DOCUMENTS 4,737,330 A   4/1988  Rau
5,092,376 A   3/1992  Blankenship et al.
6,385,836 B1  5/2002  Coltrin

FOREIGN PATENT DOCUMENTS

| DE | 3909560 | 9/1990 |
| EP | 0 234 220 | 9/1987 |
| EP | 04 00 320.4 | 11/2007 |

OTHER PUBLICATIONS

S. Dehm and D. Wurzel, "Fast, In-Situ Repair of Aircraft Panel Components," J. Aircraft, vol. 26, No. 5, pp. 476-481.*
M.R. Kessler and S.R. White, "Self-activated healing of delamination damage in woven composites," Composites Part A, vol. 32, No. 5, May 2001, pp. 683-699.*

(Continued)

*Primary Examiner*—Christina Johnson
*Assistant Examiner*—Matthew J. Daniels
(74) *Attorney, Agent, or Firm*—Dilworth & Barrese LLP

(57) ABSTRACT

In a method for filling pores between two adjacent layers of a laminate for a component with high demands upon strength and comprising several layers of fibre composite having within each layer substantially parallel fibres embedded in a matrix, a connection path is created, through which a medium may move inside the laminate, between the exterior of the laminate and the pore by exerting the laminate at least in the region of the pore for forces making slots to propagate substantially in the matrix through each laminate layer along the fibre direction of the layer. A flowing, curable material is after that applied at an outer surface of the laminate and this is brought to fill the pore through the connection path. Finally, the material filling the pore is brought to cure.

29 Claims, 2 Drawing Sheets

OTHER PUBLICATIONS

M.S. Wilenski, R. Aiken, R. Gerzeski, "Evaluation of an E-Beam Cured Material for Cryogenic Structure Usage," 47th International SAMPE Symposium, 2002, pp. 109-123.*

A.J. Russell and J.S. Ferguson, "Composite Repair Issues on the CF-18 Aircraft," AGARD Conference Proceedings, vol. 550, pp. 14-1 to 14-8.*

G. Hartwig and S. Knaak, "Fibre-epoxy composites at low temperatures," Cryogenics, vol. 24, 1984, pp. 639-647.*

D. Bhattacharyya and D.P.W. Horrigan, A study of hole drilling in Kevlar composites, Composite Science and Technology, vol. 58 (1998), pp. 267-283.*

* cited by examiner

REPAIR METHOD

BACKGROUND OF THE INVENTION

Field of the Invention and Prior Art

The present invention relates to a repair method for components consisting of laminates of composite material with high demands upon strength. Such components may be intended for all types of uses, such as in particular for flying vehicles and space crafts, for example undercarriage lids, vertical stabilisers and wing shells of aeroplanes, or cars, bridges and so on. The reason for manufacturing such components out of laminates with several layers of fiber composite—for example carbon fibre epoxy or glass fibre polyester—having within each layer substantially parallel fibres embedded in a matrix or bed, is that a very low weight may be obtained for determined demands upon strength. For obtaining a required strength of the laminate and by that of the component against forces in all directions it is important that the laminate includes layers with different fibre directions. The layers are usually applied on top of each other so that the fibre direction of a certain layer makes an angle of 30-90° with the fibre direction of adjacent layers. However, it has turned out that when layers having substantially different fibre directions are applied on top of each other, pores or air enclosures are sometimes formed therebetween. These pores extend along the interface between the two layers and may have an area of several square centimetres. The quality of the individual layers of a laminate of this type, i.e. how exactly parallel the fibres thereof are with respect to each other, has recently been increased, which has accentuated the problem with said pores, since the laminate gets in this way more tight and the air in the pores may not find any way out thereof.

Small pores do not as such impair the strength or resistance, but they have nevertheless to be plugged by any curable material, such as a glue, so that moisture or something else may not penetrate thereinto and they get larger and are connected to each other, which could have catastrophic consequences in the form of remarkably reduced strength of the component. Thus, pores having a size above a determined level have to be repaired. A method for filling pores (2) between two adjacent layers (1', 1'') of a laminate for a component with high demands upon strength and comprising several layers of fiber composite having within each layer substantially parallel fibers (5) embedded into a matrix (6), in which at least the two adjacent layers have fiber directions differing substantially, which comprises the steps:

a) a connection path, through which a medium may move inside the laminate, is created between the exterior of the laminate and the pore, b) a flowing, curable material is applied at one outer surface of the laminate and brought to fill the pore through the connection path, and c) the material filling the pore is brought to cure, is known for this sake.

Before such a filling is started the component in question has been examined with respect to such pores and these have been detected and marked. The detection takes preferably place by using ultrasound, which is reflected where the pores are present. The connection path between the exterior of the laminate and the pore is then created by drilling holes, so that a channel to the pore is produced. A flowing plastic or glue filling the pore is then injected and after that allowed to cure.

This way to proceed is associated with a number of problems. Fibres of the fibre composite carrying loads will be destroyed through the drilling, which reduces the strength of the laminate. Furthermore, it is difficult to exactly hit the pore through drilling, so that it is necessary to drill at comparatively small intervals, such as an interval of only 3 mm, which may result in a local reduction of the strength to a level being unacceptably low in some applications. A drill diameter of about 0.5 mm is normally used, which usually exceeds the diameter of a fibre of the fibre composite by a factor in the order of 100. Moreover, it is not sufficient to hit the pore through a drilling hole, but at least one additional drilling hole is required, through which the air in the pore may disappear upon injection of material in the first drilling hole.

SUMMARY OF THE INVENTION

The object of the present invention is to provide a method of the type defined above, which to a large extent finds a remedy to the inconveniences mentioned above of such methods already known.

This object is according to the invention obtained by providing such a method, in which in step a) the connection path is created by exerting the laminate at least in the region of said pore to forces making slots to propagate substantially in the matrix through each laminate layer along the fibre direction of the layer.

Such slots will not influence the strength of the laminate in a noticeable degree, but they make the laminate permeable, since gas or liquid may pass through the slots, so that a connection path between the exterior of the laminate and a said pore is achieved. By the fact that the slots of laminate layers having different fibre directions will intersect each other a connection path will be established from the exterior of the laminate to each pore having a not neglectable size. The method is less complicated and may be carried out more rapidly and to a lower cost than methods already known, besides the fact that the strength reduction gets almost neglectable and it gets easier to reach and fill smaller pores. Another advantage of connection paths in the form of thin slots or fissures instead of considerably coarser drilling holes is that the flowing material may through capillary effects be sucked into the laminate and reach the pore in question.

According to a preferred embodiment of the invention the laminate is cooled in step a) at least in the region of said pore to a sufficiently low temperature for making the matrix material between said fibres to contract so much that said slots are created along the fibres. By utilising the fact that the fibres used in this type of fibre composites have a coefficient of heat expansion being nearly zero, while the corresponding coefficient is much higher for the matrix material, the slots aimed at may be created in an extremely easy and reliable way.

According to another preferred embodiment of the invention the cooling is carried out to a temperature below −70° C., preferably below −150° C., in which it is particularly advantageous to apply liquid nitrogen on the laminate, which enables cooling down to about −200° C., but in certain applications could also carbon dioxide snow be used and the cooling then take place to about −75° C. It is conceivable to cool the entire component, but it would also be possible, and probably most often also desired, to restrict a region of the outer surface of the laminate right in front of a said pore and apply cooling medium on the laminate only within this restricted region. By this, the cooling gets easier to carry out at the same time as matrix slots are only formed where they are really favourable.

According to another preferred embodiment of the invention the connection path is created between the exterior of the laminate and a said pore by exerting the laminate to such outer forces in planes transversally to the fibre direction of the layers of the laminate that slots propagate through each layer along the fibre direction of the layer. It may for example be tried to bend a laminate with layers having two different fibre directions in planes directed substantially perpendicular to the respective fibre direction until it starts to crackle in the laminate, which means that the matrix material come loose from the fibres and slots are formed along the fibres. It is then possible to maintain the bending forces during step b) so as to act to open the slots and facilitate transport of the flowing material to the pore and remove the forces after the filling but before the curing for automatically pressing superfluous flowing material out of the slots.

According to another preferred embodiment of the invention the laminate is heated directly before and/or in connection with step b) at least in the region of said pore to a temperature necessary for making said flowing material to be a thinly fluid. This may for some epoxy glues mean heating to about +50° C., while other materials may be a sufficiently thinly fluid at room temperature.

Other measures according to the invention for facilitating the transport of the flowing material to said pore consist in applying outer forces on the laminate in planes transversely to the fibre directions of the different layers when applying the flowing material on the outer surface of the laminate as well as applying a negative air pressure on the laminate on the opposite side thereof with respect to the outer surface of the laminate to which the flowing material is applied.

A particularly advantageous material with respect to strength properties in relation to weight for components of the type in question is carbon fibre epoxy, and experiments have shown that the method according to the invention is extremely suited for this material.

Further advantages as well as advantageous features of the invention appear from the following description and the other dependent claims.

BRIEF DESCRIPTION OF THE DRAWINGS

With reference to the appended drawings, below follows a description of preferred embodiments of the invention cited as examples.

In the drawings.

DETAILED DESCRIPTION OF PREFERRED EMBODIMENTS OF THE INVENTION

The problem occupying the invention will now be explained while making reference to FIG. 1 and 2. A part of a fibre composite laminate is very simplified shown in FIG. 1, which consists of individual layers 1 having fibres directed substantially parallel to each other and embedded in a matrix. The fibres may for example be carbon fibres or glass fibres and the matrix any plastic, such as epoxy or polyester. It is advantageous that the fibres within one layer make an angle of 30-90° with the fibres in adjacent layers. The fibres in the layers 1' are then directed substantially perpendicularly to the fibres in the layers 1".

In the case of layers of carbon fibre epoxy the thicknesses thereof is typically between 0.05 and 0.2 mm, and the number of layers may for example for a wing shell of an aeroplane be about 50, and the number of layers is generally between 4 and 200.

Figure 1:
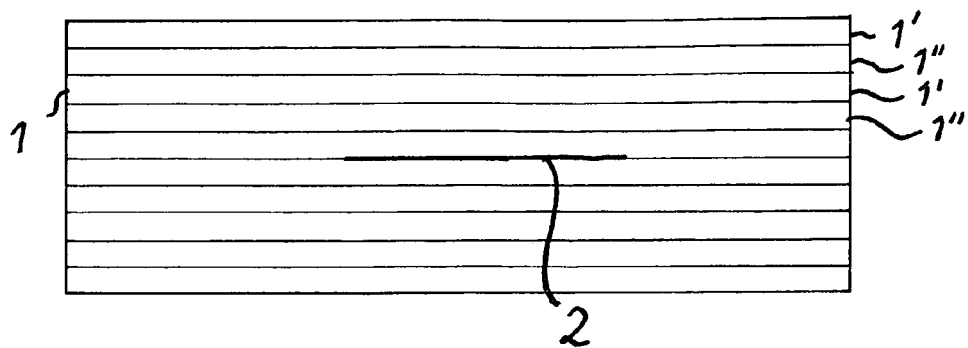
FIG. 1 is a very schematic sketch of a laminate intended to illustrate the problem to be solved by the invention.

It is shown in FIG. 1 how a so-called pore 2 in the form of an air enclosure has been created at the interface between two adjacent layers. The height, i.e. the extension in the thickness direction of the laminate, of this pore may be in the order of 0.02-0.2 mm, while it may in the interface extend over a surface of several square centimetres.

Figure 2:
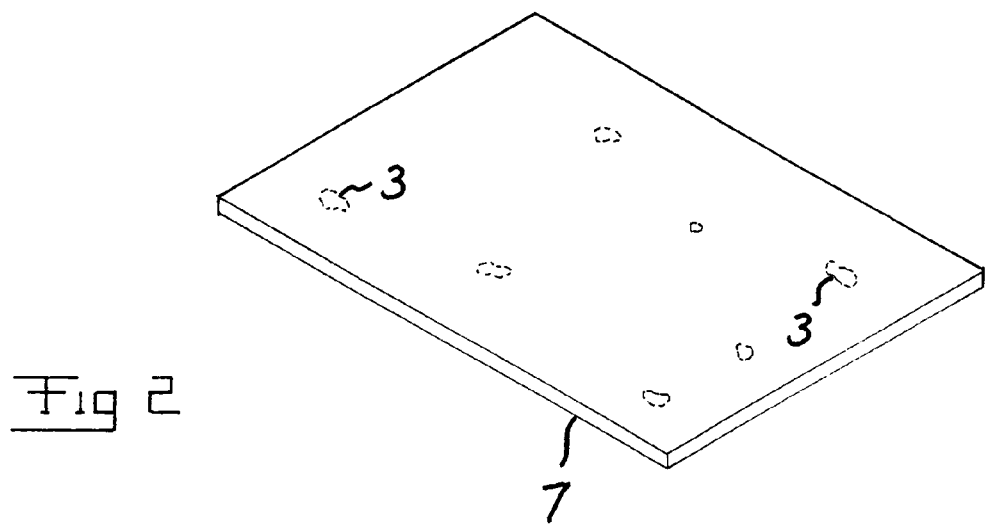
FIG. 2 is a view from above of a component of a laminate, onto which detected pores have been marked.

If ultrasound is sent through the laminate it will be reflected by such pores, which may by that be detected and marked as has been done on the component shown in FIG. 2. It is possible to determine that pores having an area below a certain size, for example 36 $mm^2$, may be accepted and shall not be taken care of. This limit is dependent upon the application and may be set completely different for for instance a component of a car and one of an aeroplane. The pores to be taken care of shall, as mentioned above, be filled by a flowing, curable material, such as any plastic or glue, for example epoxy glue LY5052 of two-component type.

Figure 4:
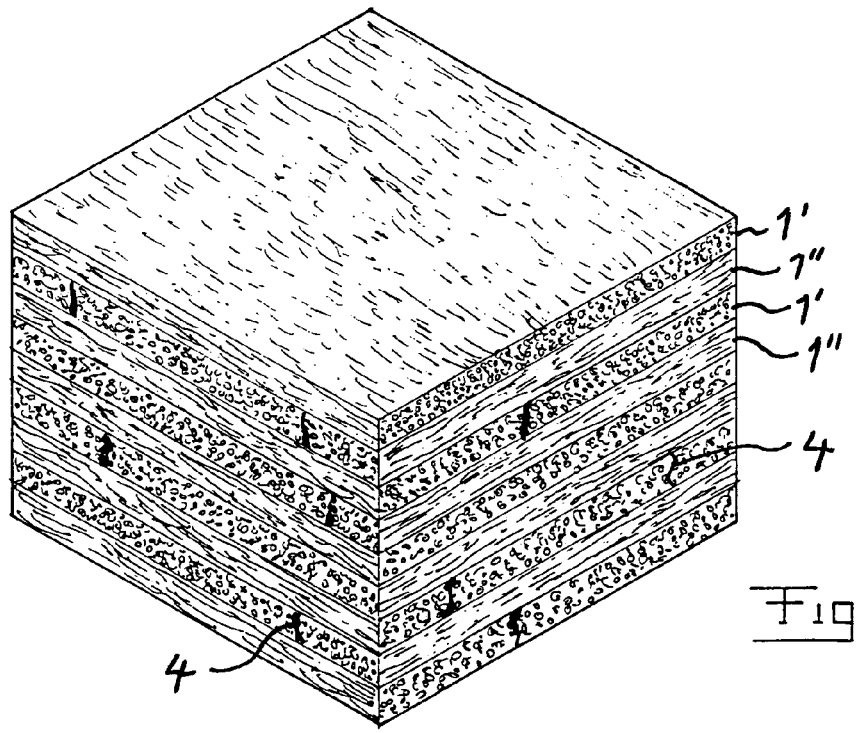
FIG. 4 is a very schematic sketch illustrating how matrix slots are formed in a fibre composite material in accordance with the invention.
Figure 3:
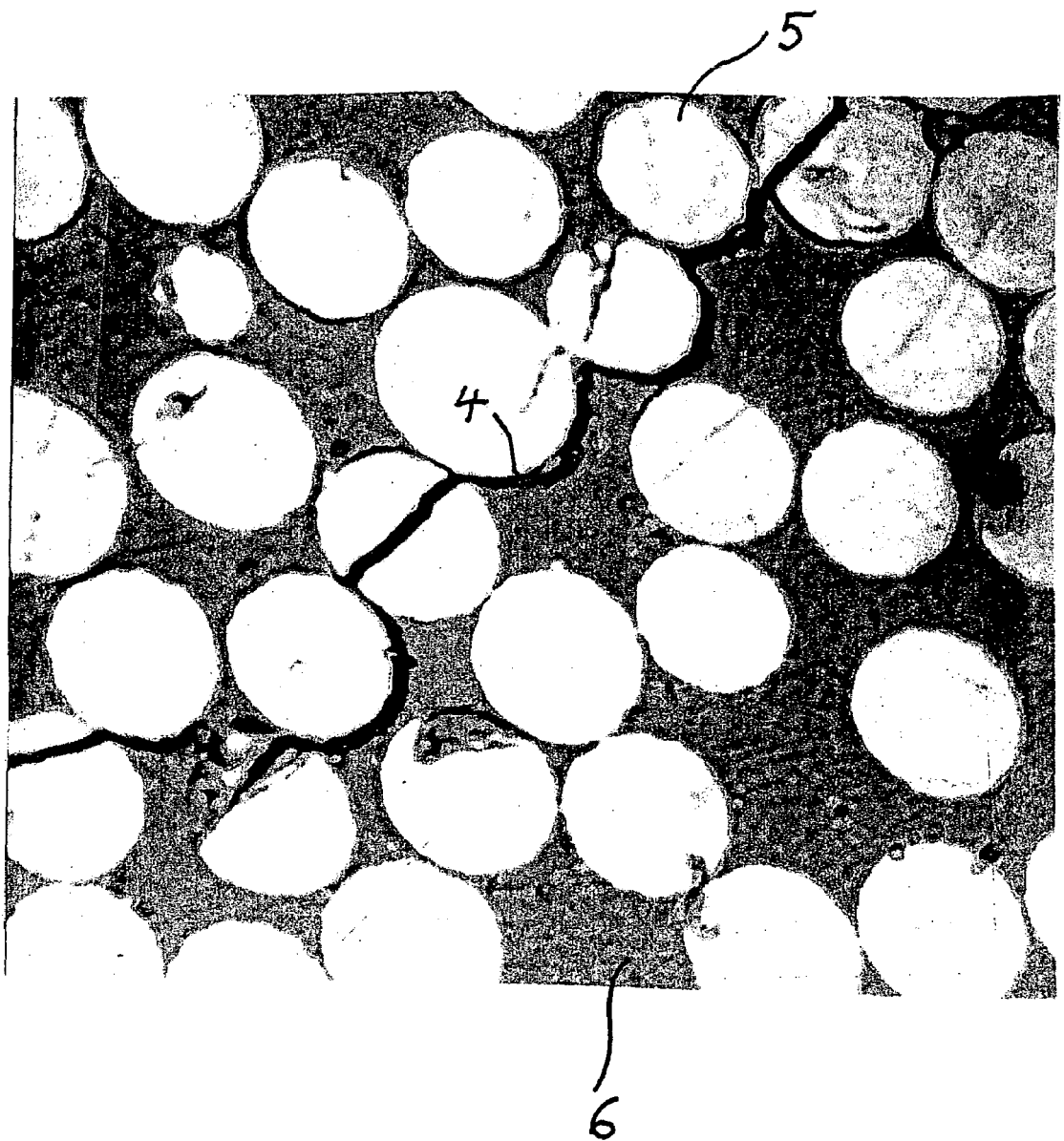
FIG. 3 is a light microscope photograph illustrating matrix slots created upon cooling a laminate of carbon fibre epoxy by liquid nitrogen.

According to a first preferred embodiment of the invention the laminate regions over a detected pore marked in FIG. 2 are restricted by any type of lateral walls and liquid nitrogen is after that poured onto the laminate in these regions and the cooling achieved by that is allowed to take place during a period of time being dependent upon the thickness of the laminate and typically between 5 and 20 minutes. The matrix material will during such a cooling contract, whereas the fibres do not show any change in length depending upon temperature changes, so that thin micro slots or fissures having a thickness in the order of 0.5-1 µm are created along the fibres, such as shown through the black line 4 on the light microscope photograph according to FIG. 3 for the case of carbon fibre epoxy. The carbon fibres 5 are shown through white circles, while the matrix material 6 is grey. These slots occur in the carbon fibre epoxy at intervals of about 0.5 mm and the slots penetrate through the entire respective laminate layer, which here has a thickness of 0.13 mm, and the slots of adjacent layers will accordingly intersect each other and a connection path is formed between the exterior of the laminate and the pore in question. This is shown in FIG. 4.

In the case of carbon fibre composite material this is then heated to a temperature exceeding +40° C., namely of about +50° C., which may take 10 minutes-2 hours, and the region in question of the laminate is then kept at this temperature during the application of an epoxy glue which is a thinly fluid at this temperature and is injected through capillary effects and/or the gravitation into said slots during a time shorter than 1 hour. The pore in question will be filled by this, and the glue will automatically cure after a certain time while filling the pore so repaired.

It is conceivable to apply outer forces on the laminate in planes transversal to the fibre directions of the different layers in connection with the injection of the flowing material so as to open the slots for facilitating the transport of the flowing material to the pore. It is also conceivable to apply a negative air pressure on the lower side of the laminate so as to facilitate this transport.

In an alternative embodiment of the method according to the invention the matrix slots may instead of said cooling be created by exerting the laminate to sufficiently strong outer forces in planes transversal to the fibre direction of the layers of the laminate to release the matrix material at the fibres and create slots. The flowing, curable material may in such a case be applied directly in connection with the slot creation while maintaining said forces, which will then act to open the slots and facilitate the transport of the flowing material to the pore. Superfluous flowing material may then by removal of said forces automatically be pressed out of the slots.

The invention is of course not in any way restricted to the preferred embodiments described above, but many possibilities to modifications thereof would be apparent to a person with skill in the art without departing from the basic idea of the invention as defined in the appended claims.

The materials used could for example be others than those described above, and the same is valid for for example the number of layers of the laminate and the thickness of the respective layer.

It is neither necessary that the layers have alternatively different fibre directions, but at least two layers of the laminate have to have this, since the laminate will otherwise be extremely weak in one direction.

It is neither necessary that layers making a mutual angle through the fibre directions of exactly 90° are present, but other angles, such as 45°, are also conceivable. It would also be possible that layers having more than two different fibre directions are present in the laminate.

The cooling and the application of outer bending forces may of course be combined in the method according to the invention.

The invention claimed is:

1. A method for filling pores (2) between two adjacent layers (1', 1") of a laminate for a component with high demands upon strength and comprising several layers of fibre composite having within each layer substantially parallel fibers (5) embedded into a matrix (6), in which at least said two adjacent layers have fibre directions differing substantially, which comprises the steps of:
   a) creating slots or fissures (4) propagating substantially in the matrix through each laminate layer along the fibre direction of the layer by cooling said laminate at least in the region (3) of said pore (2) to a sufficiently low temperature such that the matrix material contracts between said fibres to thereby create said slots or fissures (4) along the fibres, through which a material may move inside the laminate between the exterior of the laminate and the pore,
   b) without drilling, applying a flowing, curable material at one outer surface of the laminate and filling the pore through said slots or fissures, and
   c) curing the material filling the pore.

2. A method according to claim 1, wherein in step a), the cooling is carried out to a temperature below −70° C.

3. A method according to claim 1, wherein in step a), said laminate is cooled by applying liquid nitrogen or carbon dioxide snow on the laminate.

4. A method according to claim 1, comprising the additional steps of:
   restricting a region (3) of the outer surface of the laminate right in front of said pore (2), and
   in step a), applying cooling medium on the laminate only within the restricted region.

5. A method according to claim 1, comprising the additional step of:
   directly before and/or in connection with step b), heating the laminate at least in the region of said pore (2) to a temperature necessary for making said flowing material thinly fluid.

6. The method according to claim 1, comprising the additional step of, in that in step b), applying a negative air pressure on the laminate on an opposite side from an outer surface of the laminate on which the flowing material is applied, to facilitate the transport of the flowing material into the laminate through the thin slots or fissures (4).

7. The method according to claim 1, comprising the additional step of providing a laminate with layers of carbon fibre epoxy.

8. The method according to claim 1, comprising the additional step of providing a laminate with layers of glass fibre polyester.

9. The method according to claim 1, wherein in step b), an epoxy glue is applied as said flowing, curable material.

10. The method according to claim 5, wherein said heating is carried out to a temperature exceeding +40° C.

11. The method according to claim 1, comprising the additional step of providing a laminate in which fibre direction of a respective layer makes an angle of 30-90° with fibre direction of adjacent layers.

12. The method according to claim 1, comprising the additional step of providing a laminate having a thickness of each individual layer between 0.05 and 0.2 mm.

13. The method according to claim 1, comprising the additional step of providing a laminate composed of 4-200 superimposed layers.

14. The method according to claim 1, comprising the additional step of filling, in step b), pores having an area of at least 36 mm$^2$.

15. The method according to claim 1, wherein one or more pores are filled for a component for a flying vehicle or a space craft.

16. A method according to claim 2, wherein in step a), said laminate is cooled by applying liquid nitrogen or carbon dioxide snow on the laminate.

17. A method according to claim 2, wherein the cooling is carried out to a temperature below −150° C.

18. A method for filling pores (2) between two adjacent layers (1', 1") of a laminate for a component with high demands upon strength and comprising several layers of fibre composite having within each layer substantially parallel fibers (5) embedded into a matrix (6), in which at least said two adjacent layers have fibre directions differing substantially, which comprises the steps of:
   a) creating slots or fissures (4) propagating substantially in the matrix through each laminate layer along the fibre direction of the layer by exposing the laminate to outer forces in planes transverse to the fibre direction of the layers of the laminate, through which a material may move inside the laminate between the exterior of the laminate and the pore,
   b) without drilling, maintaining said outer forces applied in step a) to facilitate transport of the material to the pore (2) and applying the flowing, curable material at one outer surface of the laminate and filling the pore through said slots or fissures, and c) after step b), removing said outer forces before curing to automatically press superfluous flowing material out of the slots or fissures, and d) curing the material filling the pore.

19. A method according to claim 18, comprising the additional step of:

directly before and/or in connection with step b), heating the laminate at least in the region of said pore (2) to a temperature necessary for making said flowing material thinly fluid.

20. A method according to claim 18, wherein in step b), outer forces are applied on the laminate in planes transverse to the fibre directions of the different layers to open said thin slots or fissures (4) when applying the flowing material on the outer surface of the laminate for facilitating the transport of the flowing material to said pore (2).

21. The method according to claim 18, comprising the additional step of, in step b), applying a negative air pressure surface of the laminate on which the flowing material is applied, to facilitate the transport of the flowing material into the laminate through the thin slots or fissures (4).

22. The method according to claim 18, comprising the additional step of providing a laminate with layers of carbon fibre epoxy.

23. The method according to claim 18, comprising the additional step of providing a laminate with layers of glass fibre polyester.

24. The method according to claim 19, wherein said heating is carried out to a temperature exceeding +40° C.

25. The method according to claim 18, comprising the additional step of providing a laminate in which fibre direction of a respective layer makes an angle of 30-90° with fibre direction of adjacent layers.

26. The method according to claim 18, comprising the additional step of providing a laminate having a thickness of each individual layer between 0.05 and 0.2 mm.

27. The method according to claim 18, comprising the additional step of providing a laminate composed of 4-200 superimposed layers.

28. The method according to claim 18, comprising the additional step of filling, in step b), pores having an area of at least 36 mm$^2$.

29. The method according to claim 18, wherein one or more pores are filled for a component for a flying vehicle or a spacecraft.

* * * * *